United States Patent
Rawal et al.

(10) Patent No.: US 7,919,167 B1
(45) Date of Patent: Apr. 5, 2011

(54) CARBON-PHENOLIC ABLATOR MONOLITHS AND THEIR METHODS OF MANUFACTURE

(75) Inventors: Suraj P. Rawal, Littleton, CO (US); Richard A. Hund, Sedalia, CO (US); Kevin P. Makowski, Chatsworth, CA (US); William H. Willcockson, Morrison, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 390 days.

(21) Appl. No.: 11/936,046

(22) Filed: Nov. 6, 2007

Related U.S. Application Data

(60) Provisional application No. 60/875,559, filed on Dec. 19, 2006.

(51) Int. Cl.
  *B05D 7/22* (2006.01)
  *B32B 3/12* (2006.01)

(52) U.S. Cl. .................. 428/117; 428/313.5; 428/317.9; 428/318.4; 428/319.3; 428/319.9; 427/181; 427/201; 427/230; 427/243; 427/302; 427/314; 427/372.2

(58) Field of Classification Search .................. None
  See application file for complete search history.

(56) References Cited

U.S. PATENT DOCUMENTS

| | | | |
|---|---|---|---|
| 3,296,153 A * | 1/1967 | Snogren | 428/117 |
| 4,031,059 A * | 6/1977 | Strauss | 523/179 |
| 4,767,656 A | 8/1988 | Chee et al. | |
| 5,604,010 A | 2/1997 | Hartz et al. | |
| 5,672,389 A | 9/1997 | Tran et al. | |
| 6,180,206 B1 | 1/2001 | Kain, Jr. | |
| 6,718,776 B2 | 4/2004 | Wessling et al. | |
| 2003/0010041 A1 | 1/2003 | Wessling et al. | |

OTHER PUBLICATIONS

Calcarb Ltd Product Manufacturer's Specification Sheet.
Hexcel Product Manufacturer's Specification Sheet.
Borden Chemical, Inc. Product Manufacturer's Specification Sheet.
Emerson Cuming Composite Materials, Inc. Product Manufacturer's Specification Sheet.
Phenoset Microspheres Product Manufacturer's Specification Sheet.
Ultracor, Inc. Product Manufacturer's Specification Sheet.
Hitco Technical Services Product Manufacturer's Specification Sheet.

* cited by examiner

*Primary Examiner* — Ling Xu
(74) *Attorney, Agent, or Firm* — McDermott Will & Emery LLP

(57) ABSTRACT

A low-to-medium mass density ablative thermal protection system (TPS) comprises a phenolic-based core member comprising a honeycombed plurality of cells separated by cell walls; and an ablator material comprising a carbonaceous material and a phenolic resin material filling the cells. The ablator material may further comprise silica and phenolic resin microspheres. Embodiments include fabricating the ablative TPS by filling the cells of the core member with a liquid slurry or dry mixture of the ablator material, followed by degassing, drying, and curing of the ablator material.

17 Claims, 1 Drawing Sheet

CARBON-PHENOLIC ABLATOR MONOLITHS AND THEIR METHODS OF MANUFACTURE

CROSS-REFERENCE TO PROVISIONAL APPLICATION

This application claims priority from U.S. provisional patent application Ser. No. 60/875,559 filed Dec. 19, 2006, the entire disclosure of which is incorporated herein by reference.

FIELD OF THE DISCLOSURE

The present disclosure generally relates to materials and systems usable as heat shields and their methods of manufacture, and in particular, relates to ablative thermal protection systems (hereinafter "TPS") and materials.

BACKGROUND OF THE DISCLOSURE

Heat shield materials and systems are utilized for protecting various spacecraft types, such as crew exploration vehicles (hereinafter "CEV") and aeroentry craft, from the very high temperatures generated upon re-entry into the earth's atmosphere. The design of such materials and systems for current and future space-related missions requires heat shield materials which can safely and reliably shield the spacecraft from the potentially damaging effects of heat flux levels as high as about 1,000 $W/cm^2$ and surface pressures up to about 0.7 atmospheres.

One approach for providing heat shield materials for use in spacecraft re-entry applications involves use of a high mass density TPS material (e.g., Avcoat 5026-39/HC-G) which is injected into individual cells of a honeycomb matrix structure. However, use of high density TPS materials is undesirable in spacecraft related applications where mass is a critical factor.

Another approach for providing heat shield materials for use in spacecraft re-entry applications involves packing a cork and silicone-based super light, ablative (hereinafter "SLA") material (e.g., SLA-561 V) into a honeycomb matrix structure, e.g., a flexible or rigid phenolic honeycomb. The SLA-561 V material allows for monolithic application to the heat shield utilizing techniques developed for SLA applications on the Viking Heat Shield. The manufacturing process of SLA-561 V involves thoroughly mixing ground cork, silicone, silica fibers, silica and phenolic microballons and packing the mixture into the cells of the phenolic honeycomb core. However, a drawback associated with this approach is difficulty in mounting/fastening the thus-formed honeycomb structure to structural substrates, such as those encountered on CEVs.

In view of the foregoing, it is apparent that a clear need exists for improved ablative TPS materials and systems which advantageously provide improved thermal performance and physical properties, lower mass density, ease of application to structural substrates, and scalability for fabrication of large, seamless heat shields necessary for current and future spacecraft-related re-entry applications.

SUMMARY OF THE DISCLOSURE

An advantage of the present disclosure is improved methods of manufacturing ablative thermal protection systems (TPS).

Another advantage of the present disclosure is improved ablative thermal protection systems.

Additional advantages and features of the present disclosure will be set forth in the disclosure which follows and in part will become apparent to those having ordinary skill in the art upon examination of the following, or may be learned from the practice of the present disclosure. The advantages may be realized and obtained as particularly pointed out in the appended claims.

According to an aspect of the present disclosure, the foregoing and other advantages are achieved in part by an improved method of manufacturing an ablative thermal protection system (TPS), comprising steps of:

(a) providing a phenolic-based core member comprising a honeycombed plurality of cells separated by cell walls;

(b) providing an ablator material comprising a carbonaceous material and a phenolic resin material;

(c) filling the cells with the ablator material; and (d) curing the ablator material filling the cells.

According to preferred embodiments of the present disclosure, step (a) comprises providing a fiberglass/phenolic core member; the method further comprises a preliminary step of priming at least the cell walls of the core member provided in step (a) with a phenolic resin; the core member provided in step (a) is affixed at one side thereof to a surface of a structural substrate; the ablator material provided in step (b) further comprises hollow silica microspheres and hollow phenolic resin microspheres; and the carbonaceous material of the ablator material provided in step (b) comprises fibrous and crushed carbon foam particles.

In accordance with certain preferred embodiments of the present disclosure, step (b) comprises providing the ablator material as a liquid slurry, and step (c) comprises pouring the slurry into the cells; whereas in accordance with other preferred embodiments of the present disclosure, step (b) comprises providing the ablator material as a dry mixture, and step (c) comprises packing the dry mixture into the cells.

In either instance, step (d) comprises sequential steps of degassing and drying, pre-curing, and final curing of the ablator material.

Another aspect of the present disclosure is improved ablative TPS's fabricated according to the above methodology, having a low-to-medium mass density between about 0.26 and 0.5 $gm/cm^3$, preferably between about 0.28 and 0.35 $gm/cm^3 \pm 0.02$ $gm/cm^3$.

Yet another aspect of the present disclosure is an improved ablative thermal protection system (TPS), comprising:

(a) a phenolic-based core member comprising a honeycombed plurality of cells separated by cell walls; and (b) an ablator material filling the cells, the ablator material comprising a carbonaceous material and a phenolic resin material.

According to preferred embodiments of the present disclosure, the core member comprises a fiberglass/phenolic material; at least the cell walls of the core member are coated with a phenolic resin primer; the ablator material further comprises hollow silica microspheres and hollow phenolic resin microspheres; and the carbonaceous material of the ablator material comprises fibrous and crushed carbon foam particles.

In accordance with further preferred embodiments of the present disclosure, the ablative TPS further comprises:

(c) a structural substrate affixed to one side of the core member, the structural substrate being affixed to the core member by means of an adhesive material capable of withstanding elevated bond line temperatures encountered upon atmospheric re-entry.

According to still further embodiments of the present disclosure, the ablative TPS has a low-to-medium mass density between about 0.26 and 0.5 gm/cm$^3$, preferably between about 0.28 and 0.35 gm/cm$^3$±0.02 gm/cm$^3$.

Additional advantages of the present disclosure will become readily apparent to those skilled in this art from the following detailed description, wherein only preferred embodiments of the present disclosure are shown and described, simply by way of illustration of the best mode contemplated for practicing the present disclosure. As will be realized, the disclosure is capable of other and different embodiments, and its several details are capable of modification in various obvious respects, all without departing from the spirit of the present disclosure. Accordingly, the drawings and description are to be regarded as illustrative in nature, and not as restrictive.

BRIEF DESCRIPTION OF THE DRAWINGS

The various features and advantages of the present disclosure will become more apparent and facilitated by reference to the accompanying drawings, provided for purposes of illustration only and not to limit the scope of the invention, the various features not necessarily drawn to scale but rather drawn as to best illustrate the pertinent features, wherein.

DETAILED DESCRIPTION OF THE DISCLOSURE

Figure 1:
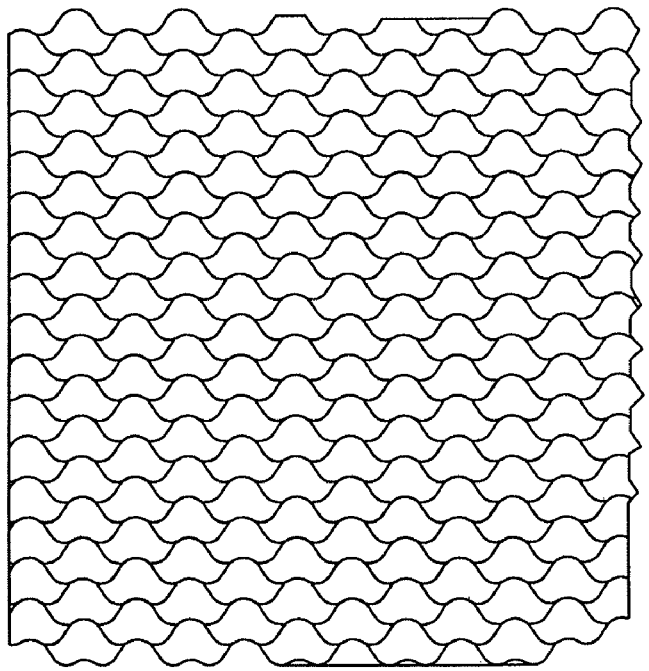
FIG. 1 is a photograph showing a phenolic impregnated carbonaceous ablator material filling cells of a phenolic-based honeycomb matrix structure according to an embodiment of the present disclosure.

The present disclosure generally relates to materials and systems usable as heat shields and their methods of manufacture, and in particular, relates to ablative TPS materials and systems.

The present disclosure addresses and effectively solves, or at least mitigates, the abovementioned problems, shortcomings, and drawbacks associated with prior TPS materials and systems, and facilitates fabrication of lower mass density TPS materials and systems comprising structural substrates.

Briefly stated, the present disclosure solves the foregoing problems by filling the cells of a phenolic-based honeycomb core structure with a carbon-phenolic mixture to form a carbon phenolic ablator monolith with a low-to-medium mass density, e.g., between about 0.26 and 0.5 gm/cm$^3$, preferably between about 0.28 and 0.35 gm/cm$^3$±0.02 gm/cm$^3$.

According to embodiments of the present disclosure, the carbon component of the carbon-phenolic mixture comprises fibrous and crushed carbon foam particles. According to further embodiments of the present disclosure, silica and phenolic hollow microspheres are included with the fibrous and crushed carbon foam particles in a phenolic resin system.

The carbon-phenolic ablator monolith with phenolic-based honeycomb core structure is readily affixed to the surface of a support structure, e.g., a structural substrate of a CEV or a heat shield of an atmospheric re-entry system of a spacecraft, as for example, by bonding with a high temperature adhesive capable of withstanding elevated bond line temperatures encountered upon atmospheric re-entry.

According to certain embodiments of the present disclosure, the cells of the phenolic-based honeycomb core structure are initially filled with a liquid slurry of the carbon-phenolic mixture (optionally containing silica and phenolic microspheres), followed by degassing, drying, and curing treatment(s) to form the ablator; whereas, according to other embodiments of the present disclosure, the cells of the phenolic-based honeycomb core structure are initially filled with a dry carbon-phenolic mixture (optionally containing silica and phenolic microspheres), followed by degassing, drying, and curing treatment(s) to yield the ablator.

The methodology afforded by the present disclosure provides an inherently seamless, ablative TPS in the form of a carbon-phenolic ablator monolith with a low-to-medium mass density, e.g., between about 0.26 and 0.5 gm/cm$^3$, preferably between about 0.28 and 0.35 gm/cm$^3$±0.02 gm/cm$^3$, which can sustain heat flux levels up to about 1,000 W/cm$^2$. Further, the methodology afforded by the present disclosure is easily scalable to provide large area TPS systems and the manufacturing process is readily automated.

It is to be understood that each of the above described embodiments and the following detailed description of the embodiments are exemplary and explanatory in nature and other embodiments may be realized and utilizing without departing from the spirit and scope of the present disclosure.

The following exemplary, but non-limitative, examples of embodiments according to the present disclosure illustrate methodologies for fabricating a carbon-phenolic ablator monolith with a low-to-medium mass density about 0.26 and 0.5 gm/cm$^3$, preferably between about 0.28 and 0.35 gm/cm$^3$±0.02 gm/cm$^3$. In this instance, typical densities of the constituent materials are as follows:

carbon foam particles, e.g., derived from Calcarb CBCF (Calcarb Inc., Rancocas, N.J.) or from Fiberform FMI (Fiber Materials, Inc., Biddeford, Me.): 0.17 gm/cm$^3$ phenolic-based honeycomb core, e.g., glass/phenolic, such as Hexcel HRP-F35-2.5 (Hexcel, Dublin, Calif.) or Ultracor® (Ultracor, Inc., Livermore, Calif.) :0.04 gm/cm$^3$ hollow silica microspheres, e.g., Eccospheres glass microspheres (Emerson Cuming Composite Materials, Inc., Canton, Mass.): ~0.13 gm/cm$^3$ hollow phenolic microspheres, e.g., Phenoset microspheres (Asia Pacific Microspheres, available from Fiberglass Supply, Inc., Bingen, Wash.): 0.136 gm/cm$^3$ Also Included are:

milled or chopped silica and carbon fibers (Hitco, Inc., Gardena, Calif.)—

1-2 μm long multiwall carbon nanotubes (SES Research Co., Houston, Tex.)

Notwithstanding the above illustration of fabrication of a carbon-phenolic ablator monolith with a low-to-medium mass density from about 0.28 to about 0.35 gm/cm$^3$±0.02 μm/cm$^3$, the methodology afforded by the present disclosure facilitates tailoring the mass density of the ablator to be within about 0.26 gm/cm$^3$ and about 0.5 gm/cm$^3$, by appropriate combination of milled carbon or carbon-containing fibers (e.g., rayon fibers), milled Calcarb or Fiberform, hollow silica microspheres, milled silica fibers, hollow phenolic spheres, and phenolic resin powder. Mixing/blending of the various ingredients to ensure uniform dispersion and density of the mixture can be accomplished in conventional manner, as by use of a "Hobart" mixer.

According to an illustrative, but non-limitative example of the slurry-based approach of the present disclosure, several small blocks of carbon foam (e.g., Fiberform or Calcarb) are crushed and sieved, e.g., with a 10-30 mesh sieve, to yield appropriately sized particles (e.g., 0.028" (700 μm) to 0.08"

(2 mm)). In addition, appropriate amounts of milled/chopped carbon fibers ranging in size from about 0.1" to about 0.25" are mixed with the sieved carbonaceous particles, and the resultant mixture blended with a solution of a phenolic resin, e.g., liquid phenolic resin (SC 1008, Borden Chemical, Inc., Columbus, Ohio) or phenolic powder (Durite FD-2170, Borden Chemical, Inc., Columbus, Ohio) in a solvent such as acetone or isopropyl alcohol (IPA), to which appropriate amounts of appropriately dimensioned hollow silica and phenolic microspheres are added. The phenolic resin provides a very thin coating on the surfaces of the carbonaceous material. Hollow silica microspheres suitable for use include Eccospheres (Emerson Cuming Composite Materials, Inc., Canton, Mass.) and hollow phenolic microspheres suitable for use include Phenoset microspheres (Fiberglass Supply, Inc., Bingen, Wash.). 0.1"-0.25" long milled silica fibers suitable for use include those available from Hitco, Inc., Gardena, Calif.

A typical mixture of particles providing enhanced product characteristics comprises about 50-60 vol. % carbonaceous particles, and about 15-20 vol. % each of phenolic and silica hollow microspheres (with milled silica fibers). The total volume ($V_T$) of the dry mixture, comprising appropriate ratios of carbonaceous particles, hollow silica, phenolic microspheres, and silica fibers, is measured. A phenolic solution with about 7 to about 9 vol. % of $V_T$ is prepared, and mixed and blended with the dry mixture of volume $V_T$ to prepare the slurry. Viscosity of the resultant slurry is adjusted, as by solvent addition/removal, to facilitate pouring and settling of the slurry for complete filling of the cells of the phenolic-based honeycomb.

Suitable phenolic-based honeycombs, e.g., phenolic/fiberglass honeycombs, for use according to the present disclosure include, for example, Hexcel HRP-F35-2.5 gm/cm$^3$ (Hexcel, Inc., Dublin, Calif.) and Ultracor® (Ultracor Inc., Livermore, Calif.). The former is a flexible honeycomb with 35 cells over a 12" length and is available in thicknesses up to 8". The latter is a flexible honeycomb with 10-35 cells/12" length, and is available in thicknesses up to 8".

The slurry-filled phenolic-based honeycomb core is then subjected to degassing/drying treatment performed at an elevated temperature for a selected interval, e.g., about 150° F. for about 1 hr., followed by vacuum treatment for further degassing. The degassed slurry-filled phenolic honeycomb is then given a pre-cure treatment performed at about 250° F. for about 2 hrs., followed by a final cure performed at about 350° F. for about 1 hr. The cured product is then subjected to final machining for obtaining suitably finished surfaces.

Optimum bonding of the slurry to the phenolic-based honeycomb core is obtained by subjecting the latter to at least one, preferably two, applications of a primer solution comprising 20% phenolic resin in acetone solution, each treatment being followed by drying for solvent removal.

In practice, the phenolic-based honeycomb core provides structural integrity to the ablator and is affixed, as by high temperature adhesive bonding, to the support structure, e.g., a heat shield of a re-entry system of a spacecraft, prior to filling of the cells with the slurry.

According to the dry mixture approach of the present disclosure, a suitably tailored/formulated dry mixture of the abovementioned ingredients (i.e., chopped carbon particles, phenolic resin powder, hollow silica microspheres, hollow phenolic microspheres, and chopped silica and/or carbon fibers or nanotubes) is well blended in a mixer (e.g., Hobart mixer) without solvent and utilized for overpacking the phenolic-based honeycomb core. Overpacking of the cells is followed by degassing and curing treatments identical to those utilized in the slurry approach. In the event the resultant ablator monolith has a slightly powdery character, a light coating of a solution of phenolic resin can be applied to the upper surface. A combination of differently sized carbon powders/fibers with chopped silica fibers may also be utilized for obtaining carbon-phenolic ablator monolith panels with smooth surface finish.

In either instance (i.e., slurry and dry powder approaches), the adhesive bond between the cured phenolic impregnated carbonaceous material and the cell walls in each of the cells of the phenolic-based honeycomb core of the ablator monolith is very good, as confirmed by mechanical testing and microstructural observations.

Figure 2:
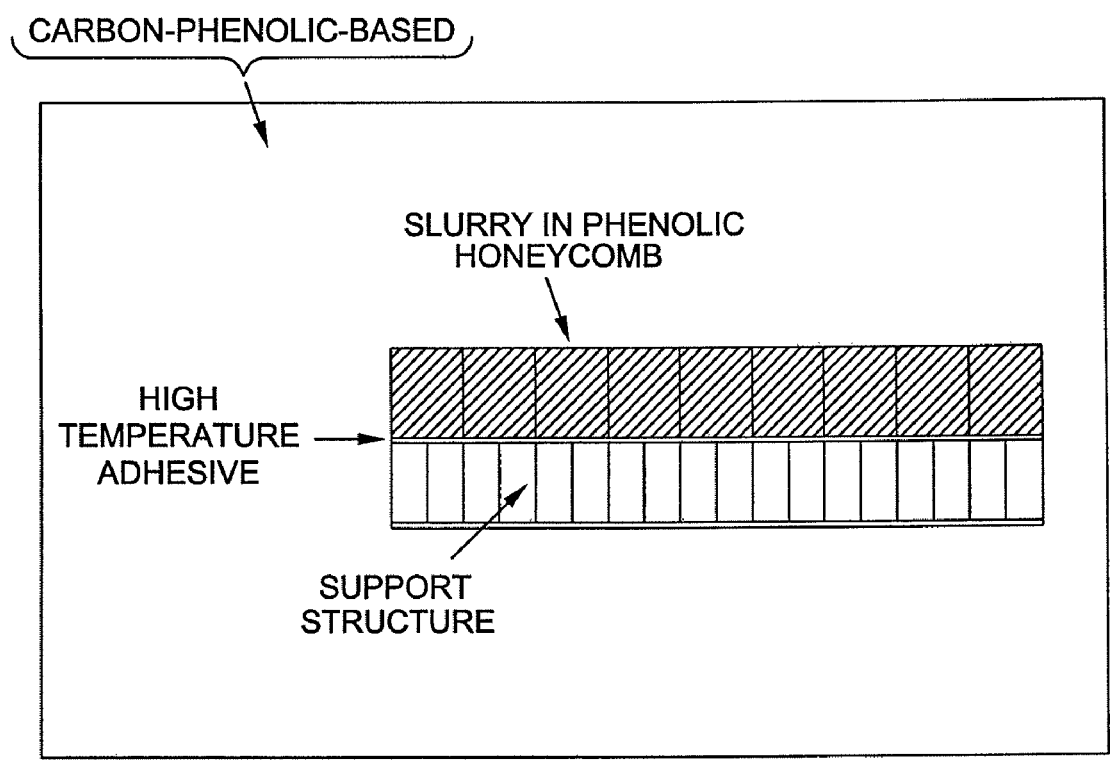
FIG. 2 is a schematic, cross-sectional diagram of a phenolic-based honeycomb matrix structure filled with a phenolic impregnated carbonaceous ablator material and affixed to a support structure according to an embodiment of the present disclosure.

Referring now to the figures, FIG. 1 is a photograph showing a cured phenolic impregnated carbonaceous material filling cells of a phenolic-based honeycomb matrix structure to form a carbon-phenolic ablator monolith according to the present disclosure; and FIG. 2 is a schematic, cross-sectional diagram of a phenolic-based honeycomb matrix structure filled with a phenolic impregnated carbonaceous material and affixed by means of a high temperature adhesive material to a support structure according to an embodiment of the present disclosure.

In summary, notable advantages afforded by the present disclosure include:

provision of a low-to-medium mass density ablative TPS which can reliably sustain high heat flux levels, i.e., up to about 1,000 W/cm$^2$;

the resultant carbon-phenolic ablator monolith panels can be readily affixed to a structural support, e.g., of a CEV or heat shield of an atmospheric re-entry system;

the manufacturing process is easily scaled to provide large size carbon-phenolic ablator monolith panels with conformal shapes; and the manufacturing process involving filling of honeycomb cells with a slurry or dry mixture of phenolic impregnated carbonaceous material is automatable for increasing cost-effectiveness.

In the previous description, numerous specific details are set forth, such as specific materials, structures, reactants, processes, etc., in order to provide a better understanding of the present disclosure. However, the present disclosure can be practiced without resorting to the details specifically set forth. In other instances, well-known processing materials and techniques have not been described in detail in order not to unnecessarily obscure the present disclosure.

Only the preferred embodiments of the present disclosure and but a few examples of its versatility are shown and described in the present disclosure. It is to be understood that the present disclosure is capable of use in various other combinations and environments and is susceptible of changes and/or modifications within the scope of the disclosed concept as expressed herein.

What is claimed is:

1. A method of manufacturing an ablative thermal protection system (TPS), said method comprising:
    (a) providing a phenolic-based core member comprising a honeycombed plurality of cells separated by cell walls;
    (b) providing an ablator material comprising a phenolic resin and a carbonaceous material in the phenolic resin wherein the carbonaceous material comprises fibrous and crushed carbon foam particles;
    (c) filling said cells with said ablator material; and
    (d) curing said ablator material filling said cells.

2. The method according to claim 1, wherein:
    said phenolic-based core member comprises a fiberglass and a phenolic material.

3. The method according to claim 1, further comprising:
a preliminary step of priming at least said cell walls of said phenolic-based core member with a phenolic resin.

4. The method according claim 1, wherein:
said phenolic-based core member is affixed at one side thereof to a surface of a structural substrate.

5. The method according to claim 1, wherein:
said ablator material further comprises hollow silica microspheres and hollow phenolic resin microspheres.

6. The method according to claim 1, wherein:
step (b) comprises providing said ablator material as a liquid slurry; and
step (c) comprises pouring said slurry into said cells.

7. The method according to claim 1, wherein:
step (b) comprises providing said ablator material as a dry mixture; and
step (c) comprises packing said dry mixture into said cells.

8. The method according to claim 1, wherein:
step (d) comprises sequential steps of degassing and drying, pre-curing, and final curing of said ablator material.

9. An ablative TPS fabricated according to the method of claim 1, wherein said ablative TPS has a mass density between about 0.26 and 0.5 gm/cm$^3$.

10. An ablative TPS fabricated according to the method of claim 3, wherein said ablative TPS has a mass density of about 0.28-0.35 gm/cm$^3$±0.02 gm/cm$^3$.

11. An ablative thermal protection system (TPS), comprising:
a phenolic-based core member comprising:
a honeycombed plurality of cells separated by cell walls; and an ablator material filling said cells,
said ablator material comprising a phenolic resin and a carbonaceous material in the phenolic resin; wherein the carbonaceous material comprises fibrous and crushed carbon foam particles.

12. The ablative TPS as in claim 11, wherein:
said phenolic-based core member comprises a fiberglass and a phenolic material.

13. The ablative TPS as in claim 11, wherein:
at least said cell walls of said phenolic-based core member are coated with a phenolic resin primer.

14. The ablative TPS as in claim 11, wherein:
said ablator material further comprises hollow silica microspheres and hollow phenolic resin microspheres.

15. The ablative TPS as in claim 11, further comprising:
a structural substrate affixed to one side of said phenolic-based core member.

16. The ablative TPS as in claim 11, wherein the ablative TPS has a mass density between about 0.26 and 0.5 gm/cm$^3$.

17. The ablative TPS as in claim 11, wherein the ablative TPS has a mass density of about 0.28-0.35 gm/cm$^3$±0.02 gm/cm$^3$.

* * * * *